(12) United States Patent
Onda

(10) Patent No.: US 12,518,563 B2
(45) Date of Patent: Jan. 6, 2026

(54) DELIVERY DRONE AND DELIVERY METHOD

(71) Applicant: JVCKENWOOD Corporation, Yokohama (JP)

(72) Inventor: Masahiro Onda, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 35 days.

(21) Appl. No.: 18/772,313

(22) Filed: Jul. 15, 2024

(65) Prior Publication Data

US 2024/0371199 A1 Nov. 7, 2024

Related U.S. Application Data

(63) Continuation of application No. PCT/JP2023/000183, filed on Jan. 6, 2023.

(30) Foreign Application Priority Data

Feb. 25, 2022 (JP) .................................. 2022-027517
Feb. 25, 2022 (JP) .................................. 2022-027518

(51) Int. Cl.
*G06V 40/16* (2022.01)
*B64U 10/00* (2023.01)
(Continued)

(52) U.S. Cl.
CPC .............. *G06V 40/172* (2022.01); *G06T 7/74* (2017.01); *G06V 20/17* (2022.01); *G06V 20/41* (2022.01);
(Continued)

(58) Field of Classification Search
CPC ...... G06V 40/172; G06V 20/17; G06V 20/41; G06V 40/176; G06T 7/74;
(Continued)

(56) References Cited

U.S. PATENT DOCUMENTS

2017/0050747 A1* 2/2017 Wessler ................. B64D 47/06
2021/0055746 A1* 2/2021 Jeong .................... G05D 1/0016

FOREIGN PATENT DOCUMENTS

JP    2020-057225    4/2020
WO   2020/012632    1/2020

OTHER PUBLICATIONS

International Search Report and Written Opinion for International Application Serial No. PCT/JP2023/000183 mailed on Mar. 28, 2023, 11 pages.

* cited by examiner

*Primary Examiner* — George Chen
*Assistant Examiner* — Duane N. Moore
(74) *Attorney, Agent, or Firm* — Amin, Turocy & Watson, LLP

(57) ABSTRACT

A delivery drone that delivers a package includes: an imager that captures a video around the drone; a location determination unit that compares, when the drone falls within a predetermined range from a delivery destination location of the package, the video captured by the imager and a receiving location identification video of the package acquired from an orderer of the package, to determine whether or not coincident locations are present; an orderer determination unit that determines, when the coincident locations are present, whether or not a terminal apparatus of the orderer is present within a predetermined distance from a current location of the drone; and a release location determination unit that determines, when the terminal apparatus is present within the predetermined distance from the current location of the drone, a location that coincides with the receiving location identification video of the package as a release location of the package.

10 Claims, 9 Drawing Sheets

(51) Int. Cl.
*B64U 101/30* (2023.01)
*B64U 101/64* (2023.01)
*G06T 7/73* (2017.01)
*G06V 20/17* (2022.01)
*G06V 20/40* (2022.01)

(52) U.S. Cl.
CPC ............ *G06V 40/176* (2022.01); *B64U 10/00* (2023.01); *B64U 2101/30* (2023.01); *B64U 2101/64* (2023.01); *G06T 2207/10032* (2013.01); *G06T 2207/30201* (2013.01)

(58) Field of Classification Search
CPC ........... G06T 2207/10032; G06T 2207/30201; B64U 2101/64; B64U 10/00; B64U 2101/30
See application file for complete search history.

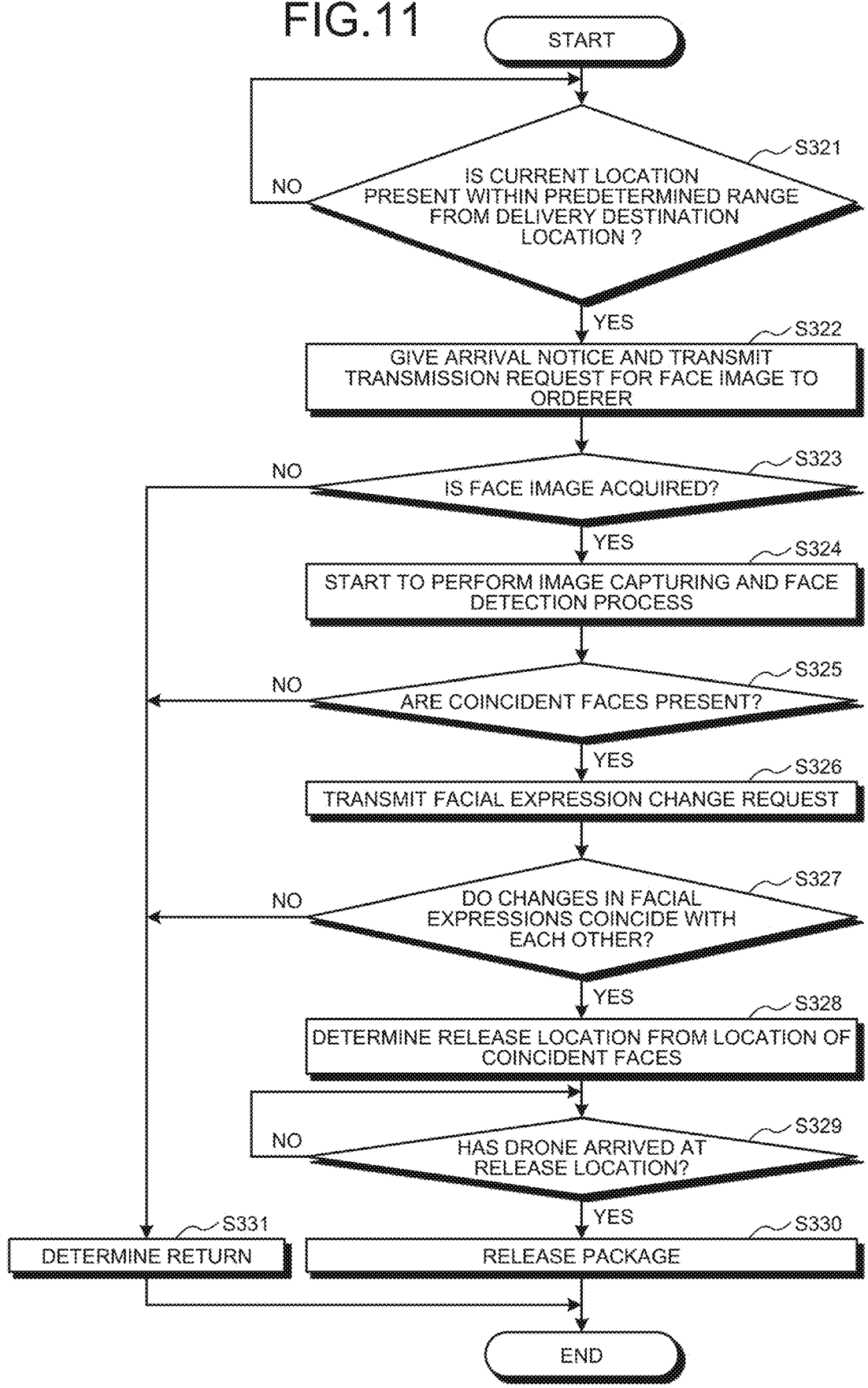

DELIVERY DRONE AND DELIVERY METHOD

CROSS-REFERENCE TO RELATED APPLICATIONS

This application is a Continuation of PCT International Application No. PCT/JP2023/000183 filed on Jan. 6, 2023 which claims the benefit of priority from Japanese Patent Applications No. 2022-027517 and No. 2022-027518, both filed on Feb. 25, 2022, the entire contents of all of which are incorporated herein by reference.

FIELD OF THE INVENTION

The present application relates to a delivery drone and a delivery method.

BACKGROUND OF THE INVENTION

A technology for generating information on a candidate landing location based on a video that is captured by an unmanned aerial vehicle, that is, what is called a drone, has been disclosed (for example, see Japanese Laid-open Patent Publication No. 2020-057225). A technology for identifying a destination by comparing a captured image and a destination image has been disclosed (for example, see WO publication No. 2020/012632).

In the future, when a package delivery from a company to an individual, a package delivery between individuals, or the like is performed by using a drone, it is not always possible that all of receivers can secure a pick-up location for the drone. Further, it is highly difficult to determine the pick-up location by only the drone. Furthermore, it is expected that pick-up locations that are provided by individuals are often visually similar to one another, and therefore, when a location is determined by only the video, it is likely that an erroneous location is determined. Moreover, when a receiver is absent, a third person may receive a package.

SUMMARY OF THE INVENTION

A delivery drone and a delivery method are disclosed.

According to one aspect of the present application, there is provided a delivery drone that delivers a package comprising: an imager configured to capture a video around the drone; a location determination unit configured to compare, when the drone falls within a predetermined range from a delivery destination location of the package, the video that is captured by the imager and a receiving location identification video of the package that is acquired from an orderer of the package, to determine whether or not coincident locations are present; an orderer determination unit configured to determine, when the location determination unit determines that the coincident locations are present in the video that is captured by the imager and the receiving location identification video of the package, whether or not a terminal apparatus that is owned by the orderer of the package is present within a predetermined distance from a current location of the drone; and a release location determination unit configured to determine, when the orderer determination unit determines that the terminal apparatus that is owned by the orderer of the package is present within the predetermined distance from the current location of the drone, a location that coincides with the receiving location identification video of the package as a release location of the package.

According to one aspect of the present application, there is provided a delivery drone that delivers a package comprising: an imager configured to capture a video around the drone; a face detection unit configured to detect, when the drone falls within a predetermined range from a delivery destination location of the package, a human face from the video that is captured by the imager and a video that is acquired from an orderer of the package; a face determination unit configured to compare the human face that is detected from the video that is captured by the imager and the human face that is detected from the video that is acquired from the orderer of the package, to determine whether or not the human faces coincide with each other; and a release location determination unit configured to determine, when the face determination unit determines that the human face that is detected from the video that is captured by the imager and the human face that is detected from the video that is acquired from the orderer of the package coincide with each other, a location of the human face that is detected from the video that is captured by the imager as a release location of the package.

According to one aspect of the present application, there is provided a delivery method implemented by a package delivery system by using a delivery drone comprising: comparing, when the drone falls within a predetermined range from a delivery destination location of the package, a video that is captured by an imager that captures a video around the drone and a receiving location identification video of the package that is acquired from an orderer of the package to determine whether or not coincident locations are present; determining, when it is determined that the coincident locations are present in the video that is captured by the imager and the receiving location identification video of the package, whether or not a terminal apparatus that is owned by the orderer of the package is present within a predetermined distance from a current location of the drone; and determining, when it is determined that the terminal apparatus that is owned by the orderer of the package is present within the predetermined distance from the current location of the drone, a location that coincides with the receiving location identification video of the package as a release location of the package.

The above and other objects, features, advantages and technical and industrial significance of this application will be better understood by reading the following detailed description of presently preferred embodiments of the application, when considered in connection with the accompanying drawings.

BRIEF DESCRIPTION OF THE DRAWINGS

FIG. 11 is a diagram illustrating an example of a flow of processes performed by the drone of the package delivery system according to a fifth embodiment.

DETAILED DESCRIPTION OF THE INVENTION

Embodiments of a delivery drone (hereinafter, referred to as a "drone") and a delivery method according to the present application will be described in detail below with reference to the accompanying drawings. The present application is not limited by the embodiments below.

First Embodiment

Package Delivery System

Figure 1:
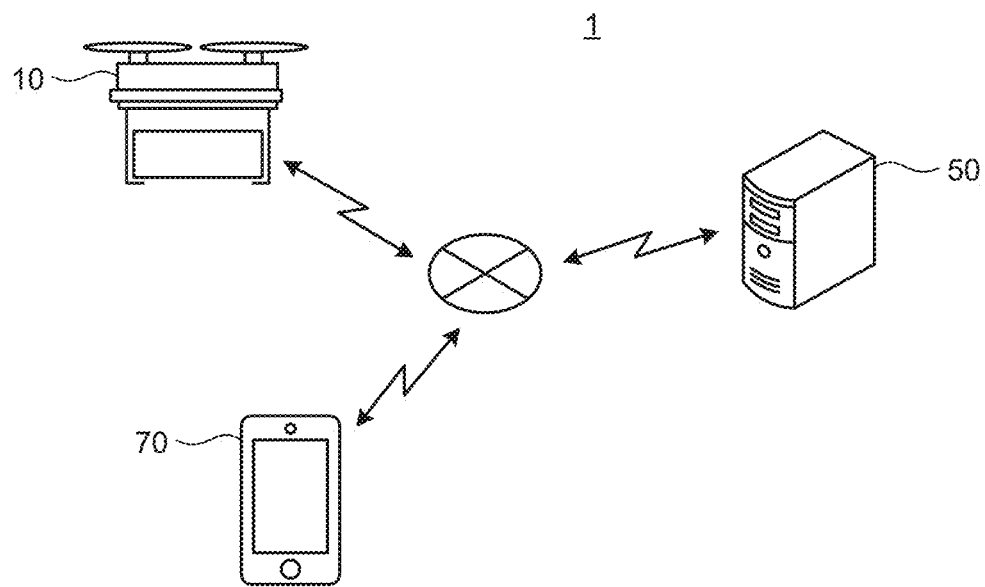
FIG. 1 is a schematic diagram of a package delivery system according to a first embodiment.

FIG. 1 is a schematic diagram of a package delivery system 1 according to a first embodiment. The package delivery system 1 is a system that delivers a package by using a drone 10. The package delivery system 1 includes the drone 10 and a package delivery control apparatus 50. In the present embodiment, the package delivery system 1 includes the drone 10, the package delivery control apparatus 50, and a terminal apparatus 70. The drone 10, the package delivery control apparatus 50, and the terminal apparatus 70 are able to communicate information via a network.

Drone

Figure 2:
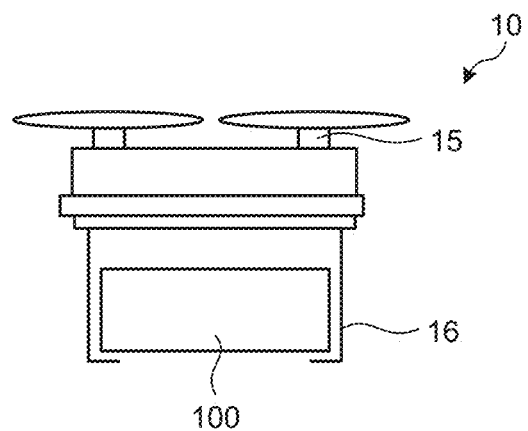
FIG. 2 is a schematic diagram of a drone.

FIG. 2 is a schematic diagram of the drone 10. The drone 10 includes a driving unit 15 for flight and a release mechanism 16 for releasing a package from a package holding state. FIG. 2 illustrates a state in which a package 100 is being held. The drone 10 is an unmanned aerial vehicle that delivers a package to a destination. The drone 10 delivers a package while adopting delivery destination location information on the package as a destination. The drone 10 may autonomously flies to the destination, for example. The drone 10 may fly to the destination by being operated by an operator via a remote controller. The drone 10 may fly to the destination by a combination of autonomous flight and operation by an operator. In the description below, explanation will be given based on an assumption that the drone 10 autonomously flies to the destination.

The drone 10 flies to the destination while mounting a package that is ordered by an orderer on a main body. The package is held by, for example, arms or the like that extend from the main body. As a method of holding the package by the drone 10, a well-known method is available, and the method is not specifically limited. The drone 10, when arriving at the destination, performs control of determining a package receiving location and releasing the package in the sky above the receiving location or by landing on the receiving location.

The package may be transported from a business office or the like of a delivery source or a delivery company to the destination by the drone 10, for example. The package may be transported by, for example, a vehicle from the business office of the delivery company to a certain location that is a few kilometers (km) before the destination, and may be delivered from the certain location to the destination by the drone 10.

Figure 3:
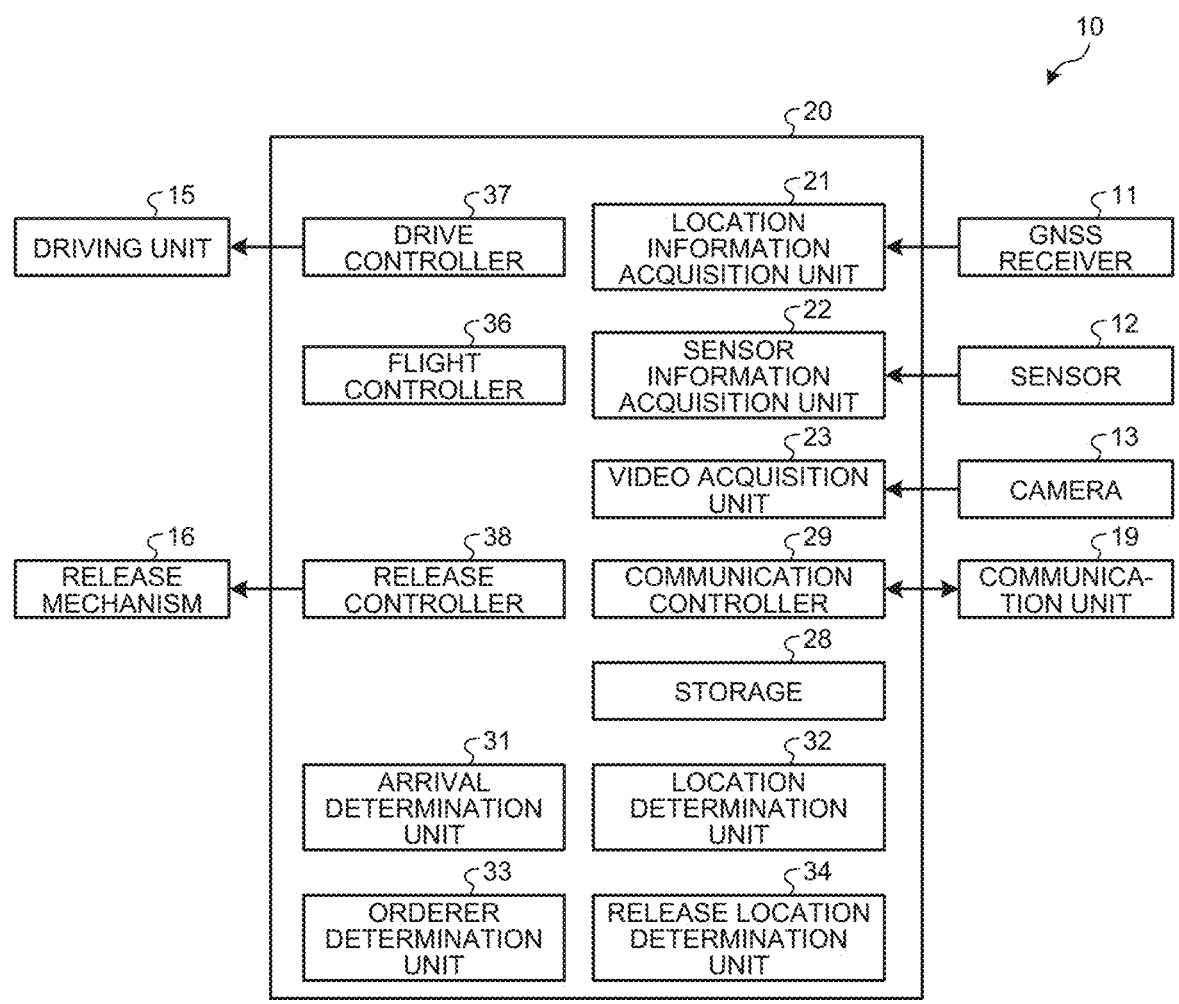
FIG. 3 is a block diagram illustrating a configuration example of the drone according to the first embodiment.

FIG. 3 is a block diagram illustrating a configuration example of the drone 10. The drone 10 includes a Global Navigation Satellite System (GNSS) receiver 11, a sensor 12, a camera (imager) 13, the driving unit 15, the release mechanism 16, a communication unit 19, and a controller 20. The drone 10 is able to communicate information with the package delivery control apparatus 50 via a network by using the communication unit 19 that is controlled by a communication controller 29.

The GNSS receiver 11 receives a GNSS signal from GNSS satellites. The GNSS receiver 11 outputs the received GNSS signal to a location information acquisition unit 21 of the controller 20. The GNSS receiver 11 is configured with, for example, a GNSS reception circuit, an antenna, and the like that are able to receive the GNSS signal.

The sensor 12 is a sensor that detects an object around the drone 10. The sensor 12 is, for example, an ultrasound sensor, an infrared sensor, or the like that is arranged around the drone 10. The sensor 12 is, for example, a sensor that detects an obstacle around the drone 10. For example, the sensor 12 is a sensor that detects a flight altitude of the drone 10 from the ground. The altitude sensor 12 outputs detected sensor data to a sensor information acquisition unit 22.

The camera 13 is a camera that captures a video around the drone 10. The camera 13 captures an image around the destination. In the present embodiment, the camera 13 captures a video that is used to control autonomous flight of the drone 10. In the present embodiment, the camera 13 captures a video that determines a position of the package receiving location. The camera 13 is mounted on the drone 10. The camera 13 is arranged on the main body of the drone 10 with face down, for example. The camera 13 continuously capture videos during a period from a start of flight of the drone 10 to an end of the flight, for example. The camera 13 outputs the captured video to a video acquisition unit 23 of the controller 20.

The driving unit 15 is a motor that causes the drone 10 to fly. The driving unit 15 is, for example, a motor that controls rotation of propellers of the drone 10. Rotation of the driving unit 15 is controlled by a control signal from a drive controller 37 of the controller 20. By controlling the rotation of the driving unit 15, the drone 10 performs various kinds of flight operation, such as takeoff and landing, forward movement, circling, upward movement, downward movement, and hovering.

The release mechanism 16 is a driving mechanism that includes an actuator, a motor, or the like that causes a holder unit that holds the package in the drone 10 to operate. The release mechanism 16 is, for example, an actuator that operates an arm that holds the package in the drone 10. The release mechanism 16 is controlled by a control signal from a release controller 38 of the controller 20. By controlling the release mechanism 16, holding and releasing of the package are switched from one to the other.

The communication unit 19 is a communication unit that performs wide area radio communication. The communication unit 19 communicates information with the package delivery control apparatus 50 via a network, for example. The network is, for example, the Internet network, but not limited thereto. The communication unit 19 is configured with, for example, a wide area radio communication module for a mobile phone network. The communication unit 19 may be configured with a communication module for Wi-Fi (registered trademark) or the like, and may realize wide area radio communication by connecting to an arbitrary access point, a different smartphone, or the like. In the present embodiment, the communication unit 19 acquires information on an order of a package from the package delivery control apparatus 50 that is an example of a different apparatus.

Examples of the information on the order of the package include information indicating a delivery instruction, delivery destination location information on the package, terminal information for uniquely identifying the terminal apparatus 70, a receiving location identification video captured by the terminal apparatus 70, and current location information on the terminal apparatus 70.

Controller

The controller 20 is, for example, an arithmetic processing device (control apparatus) that includes a Central Processing Unit (CPU) or the like. The controller 20 loads a stored program onto a memory and executes a command that is included in the program. The controller 20 includes an internal memory (not illustrated), and the internal memory is used to temporarily store therein data for the controller 20. The controller 20 controls the drone 10. The controller 20 includes the location information acquisition unit 21, the sensor information acquisition unit 22, the video acquisition unit 23, a storage 28, the communication controller 29, an arrival determination unit 31, a location determination unit 32, an orderer determination unit 33, a release location determination unit 34, a flight controller 36, the drive controller 37, and the release controller 38. Therefore, the controller 20 is a delivery controller that implements a delivery method using the drone 10, and is a computer that executes a delivery program.

The location information acquisition unit 21 calculates current location information on the drone by a well-known method based on a radio wave that is received by the GNSS receiver 11.

The sensor information acquisition unit 22 acquires sensor data from the sensor 12. The sensor information acquisition unit 22 acquires, for example, sensor data by which an obstacle around the drone 10 is detectable. The sensor information acquisition unit 22 acquires, for example, sensor data by which a flight altitude of the drone 10 from the ground is detectable.

The video acquisition unit 23 acquires a video that is captured by the camera 13. The video acquisition unit 23 outputs the acquired video to the flight controller 36. The video acquisition unit 23 may store the acquired video in a storage apparatus (not illustrated) or may output the acquired video to an external apparatus, such as a remote monitoring facility of a delivery company, under the control of the communication controller 29.

The storage 28 is a storage apparatus that stores therein a program, data, and the like that are used by the controller 20. As the storage 28, for example, at least one of a non-volatile semiconductor memory and a volatile semiconductor memory, such as a Read Only Memory (RAM), a Random Access Memory (ROM), a flash memory, an Erasable Programmable Read Only Memory (EPROM), and an Electrically Erasable Programmable Read Only Memory (EEPROM), is used.

The communication controller 29 controls the communication unit 19 and controls communication with the package delivery control apparatus 50. The communication controller 29 transmits, when a delivery preparation for the package is completed, delivery preparation completion information that indicates completion of the delivery preparation to the package delivery control apparatus 50. The communication controller 29 receives information indicating a delivery instruction from the package delivery control apparatus 50. The communication controller 29 receives, from the package delivery control apparatus 50, the delivery destination location information, the terminal information for uniquely identifying the terminal apparatus 70, the receiving location identification video captured by the terminal apparatus 70, and the current location information on the terminal apparatus 70.

The delivery destination location information is information for identifying a location of a package delivery destination. The delivery destination location information is indicated by, for example, an address or longitude and altitude. The delivery destination location information is information for identifying a destination of the drone 10.

The communication controller 29 transmits, to the package delivery control apparatus 50, a re-transmission request for the receiving location identification video for the terminal apparatus 70. The communication controller 29 receives, from the package delivery control apparatus 50, the receiving location identification video that is re-transmitted from the terminal apparatus 70.

The arrival determination unit 31 determines arrival of the drone 10 at the delivery destination. The arrival determination unit 31 determines that the current location of the drone 10 included in the current location information acquired by the location information acquisition unit 21 falls within a predetermined range from the delivery destination location included in the delivery destination location information on the package that is acquired from the package delivery control apparatus 50 via the communication unit 19. More specifically, the arrival determination unit 31 determines arrival when the current location information on the drone 10 falls within the predetermined range, such as within 10 meters (m), from the delivery destination location information.

The predetermined range is a range in which the camera 13 is able to capture a video by which the receiving location is recognizable.

The location determination unit 32 compares, when the arrival determination unit 31 determines that the current location information on the drone 10 falls within the predetermined range from the delivery destination location information on the package, the video that is captured by the camera 13 and a receiving location identification video of the package that is acquired via the communication unit 19 and determines whether or not coincident locations are present. More specifically, the location determination unit 32 compares the video that is captured by the camera 13 and the receiving location identification video, and determines whether or not a video that coincides with the receiving location identification video is present, in other words, whether or not a location that coincides with the receiving location identification video is present. Meanwhile, the receiving location identification video is usually a video that is captured at a human height, and the video that is captured by the camera 13 is an aerial video that is captured from the sky. Therefore, for example, it is determined whether characteristic colors, characteristic shapes, or characteristic objects, which are detected from the videos, are coincident with each other.

In the present embodiment, the location determination unit 32 compares the video that is captured by the camera 13 and the receiving location identification video of the package that is acquired from the terminal apparatus 70 that is owned by an orderer of the package via the communication unit 19, and determines whether or not coincident locations are present.

The orderer determination unit 33, when the location determination unit 32 determines that the coincident locations are present in the video that is captured by the camera 13 and the receiving location identification video of the package, determines whether or not the terminal apparatus 70 that is owned by the orderer of the package is present within a predetermined distance from a current location of the drone 10.

The orderer determination unit 33 may determine whether or not the terminal apparatus 70 is present within the predetermined distance from the current location of the drone 10 based on the current location information on the drone 10 and the current location information on the terminal apparatus 70 that is acquired from the terminal apparatus 70 that is owned by the orderer of the package via the communication unit 19.

When the drone 10 and the terminal apparatus 70 are able to perform near field communication within the predetermined distance, the orderer determination unit 33 may determine that the terminal apparatus 70 is present within the predetermined distance from the current location of the drone 10 when the drone 10 and the terminal apparatus 70 are communicably connected to each other.

The orderer determination unit 33 may determine that the terminal apparatus 70 is present within the predetermined distance from the current location of the drone 10 by using a BLE beacon with a communication distance of 5 m or 10 m which is generated by the drone 10. More specifically, the drone 10 generates the BLE beacon with the communication distance of 5 m or 10 m. Further, upon receiving the beacon, the terminal apparatus 70 of the orderer transmits beacon reception information indicating that the beacon is received to the package delivery control apparatus 50. The package delivery control apparatus 50, upon receiving the beacon reception information from the terminal apparatus 70, transmits the beacon reception information to the drone 10. In this case, it may be possible to request the terminal apparatus 70 to activate a dedicated application for receiving the beacon. The terminal apparatus 70 transmits, by activating the dedicated application, the beacon reception information to the package delivery control apparatus 50 automatically or based on operation of the orderer upon receiving the beacon from the drone.

The release location determination unit 34 determines, when the orderer determination unit 33 determines that the terminal apparatus 70 that is owned by the orderer of the package is present within the predetermined distance from the current location of the drone 10, a location that coincident with the receiving location identification video as a release location of the package. More specifically, the release location determination unit 34 performs an image recognition process on the receiving location identification video, and determines a release location while avoiding a location at which an object is detected. Further, the release location determination unit 34 performs an image recognition process on the video that is captured by the camera 13, and when the determined release location is recognized, the release location determination unit 34 determines that the determined release location is the release location of the package.

In the present embodiment, the release location determination unit 34 detects a characteristic shape or a characteristic object from the receiving location identification video, and determines the release location of the package based on a location of the characteristic shape or the characteristic object. The release location determination unit 34 may determine the release location of the package by, for example, recognizing the characteristic shape or the like of an entrance of a house or an outside of the house. The release location determination unit 34 may determine the release location of the package by, for example, recognizing a characteristic object, such as a vehicle or a storage. The release location determination unit 34 may perform, for example, image processing on the receiving location identification video, and determine the release location of the package by recognizing a design, a character, or a symbol that represents the receiving location.

The flight controller 36 controls flight of the drone 10. In the present embodiment, the flight controller 36 causes the drone 10 to fly to the release location that is determined by the release location determination unit 34. The flight controller 36 controls an autonomous flight while adopting the delivery destination location information as a destination based on location information on the current location of the drone 10 that is acquired by the location information acquisition unit 21. More specifically, the flight controller 36 starts an autonomous flight to the destination when receiving information indicating a delivery instruction from the package delivery control apparatus 50. First, the flight controller 36 acquires, from the package delivery control apparatus 50, the delivery destination location information via the communication controller 29, for example. The flight controller 36 searches a flight route from the current location to the destination based on map information (not illustrated), for example. The flight controller 36 outputs a control signal to the drive controller 37 to cause the drone 10 to autonomously fly to the destination in accordance with the searched flight route. The flight controller 36 outputs, for example, a control signal that includes the searched flight route and a flight altitude to the drive controller 37.

The flight controller 36 may control an autonomous flight to the destination based on the video that is acquired by the video acquisition unit 23, in addition to the location information. The flight controller 36 performs, for example, image processing on the video, and when an obstacle is recognized in the path of the drone 10, the flight controller 36 outputs a control signal for controlling avoidance of the obstacle. When, for example, the obstacle is recognized based on the video, the flight controller 36 outputs a control signal that causes the drone 10 to circle, move upward, or move downward.

In the present embodiment, the flight controller 36 may cause the drone 10 to slowly fly while circling around the destination. More specifically, when the arrival determination unit 31 determines that the drone 10 has arrived at the destination, the flight controller 36 may output a control signal that causes the drone 10 to slowly fly while circling around the destination.

In the present embodiment, the flight controller 36 may cause the drone 10 to hover or move downward to about 1 to 3 m above the ground at the destination. Further, when the location determination unit 32 determines that the current location of the drone 10 included in the current location information falls within the predetermined range from the delivery destination location included in the delivery destination location information on the package, the flight controller 36 may output a control signal that causes the drone 10 to hover in the sky.

The drive controller 37 outputs a control signal for controlling the driving unit 15. More specifically, the drive controller 37 outputs a control signal for controlling rotation of the propellers of the drone 10. The drive controller 37 controls the driving unit 15 such that autonomous flight is performed while adopting the delivery destination location information as the destination based on the control signal output from the flight controller 36.

In the present embodiment, the drive controller 37 causes the drone 10 to fly to the destination. More specifically, the drive controller 37 outputs a control signal that causes the drone 10 to fly to the destination, to the driving unit 15 based on the control signal output from the flight controller 36. The drive controller 37 outputs, to the driving unit 15, a control signal that causes the drone 10 to circle, move upward, or move downward, based on the control signal output from the flight controller 36.

Alternatively, in the present embodiment, the drive controller 37 may cause the drone 10 to slowly fly while circling around the destination based on the control signal output from the flight controller 36. More specifically, the drive controller 37 outputs, to the driving unit 15, a control signal that causes the drone 10 to slowly fly while circling around the destination, based on the control signal output from the flight controller 36.

In the present embodiment, the drive controller 37 causes the drone 10 to hover at the destination based on the control signal output from the flight controller 36. More specifically, the drive controller 37 outputs, to the driving unit 15, a control signal that causes the drone 10 to hover in the sky above the terminal apparatus 70 or a control signal that causes the drone 10 to move downward, based on the control signal output from the flight controller 36.

The release controller 38 controls release of the package. The release controller 38 releases the package at the release location. The release controller 38 causes the release mechanism 16 to hold the package while the drone 10 is flying to the destination.

In the present embodiment, when the release location determination unit 34 determines that the location is the release location of the package, the release controller 38 outputs a control signal for controlling the release mechanism 16. More specifically, when the release location determination unit 34 determines that the location is the release location of the package, the release controller 38 outputs a control signal for releasing the package to the release mechanism 16. For example, the release controller 38 outputs a control signal for releasing the package to the actuator that operates the arms that hold the package in the drone 10.

Package Delivery Control Apparatus

Figure 4:
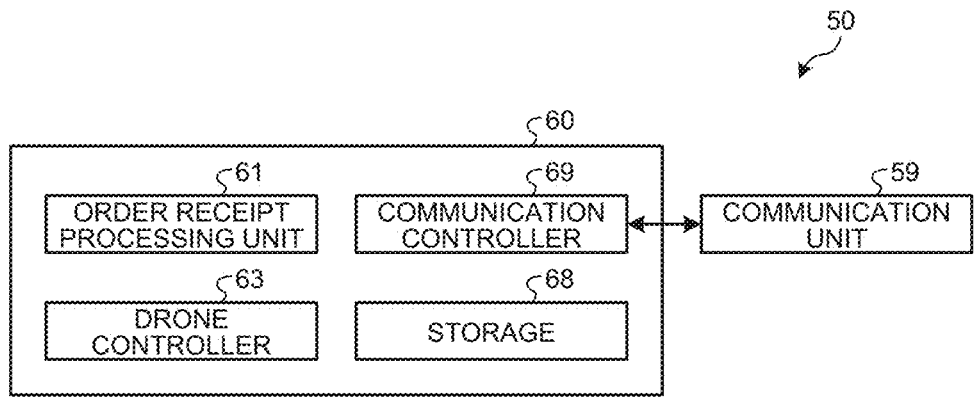
FIG. 4 is a block diagram illustrating a configuration example of a package delivery control apparatus.

FIG. 4 is a block diagram illustrating a configuration example of the package delivery control apparatus 50. The package delivery control apparatus 50 is a server apparatus that is managed or used by a business operator who performs electronic commerce or a package delivery operator, and may include multiple server apparatuses. The package delivery control apparatus 50 is able to communicate information with the drone 10 and the terminal apparatus 70 via a network. The package delivery control apparatus 50 performs an order receipt process for package delivery and a package delivery process. The package delivery control apparatus 50 includes a communication unit 59 and a controller 60.

The package delivery control apparatus 50 receives an order of a package from the orderer. In this case, the package delivery control apparatus 50 acquires, for example, information such as an e-mail address that communicably identifies the terminal apparatus 70 of the orderer, the delivery destination location information, the receiving location identification video, and the current location information on the terminal apparatus 70. The package delivery control apparatus transmits, to the drone 10 on which the package that is ordered by the orderer is mounted, the delivery destination location information, the receiving location identification video, and the current location information on the terminal apparatus 70.

The communication unit 59 is a communication unit that performs wide area radio communication. The communication unit 59 communicates information with the drone 10 and the terminal apparatus 70 via a network, for example. The network is, for example, the Internet network, but not limited thereto. The communication unit 59 is configured with, for example, a wide area radio communication module for a mobile phone network. The communication unit 59 may be configured with a communication module for Wi-Fi (registered trademark) or the like, and may realize wide area radio communication by connecting to an arbitrary access point, a different smartphone, or the like.

Controller

The controller 60 is, for example, an arithmetic processing apparatus (control apparatus) that includes a Central Processing Unit (CPU) or the like. The controller 60 loads a stored program onto a memory and executes a command that is included in the program. The controller 60 includes an internal memory (not illustrated), and the internal memory is used to temporarily store therein data for the controller 60. The controller 60 controls the package delivery control apparatus 50. The controller 60 includes an order receipt processing unit 61, a drone controller 63, a storage 68, and a communication controller 69.

The order receipt processing unit 61 receives an order of package delivery from, for example, the terminal apparatus 70, an external apparatus, or the like. The order receipt processing unit 61 acquires, upon receiving the order, the delivery destination location information from the terminal apparatus 70, an external apparatus, or the like. The order receipt processing unit 61 may receive, upon receiving the order, information indicating at least one of the orderer of the package, a delivery date and time, a weight of the package, a size of the package, and a type of the package from the terminal apparatus 70, an external apparatus, or the like, together with the delivery destination location information, for example.

The drone controller 63, at the start of delivery of the package, outputs information indicating the delivery instruction to the drone 10 that is designated for delivery.

The storage 68 is a storage apparatus that stores therein a program, data, and the like that are used by the controller 60. As the storage 68, for example, at least one of a non-volatile semiconductor memory and a volatile semiconductor memory, such as a RAM, a ROM, a flash memory, an EPROM, and an EEPROM, and a magnetic disk is used.

The communication controller 69 controls the communication unit 59 and controls communication with the drone 10 and the terminal apparatus 70. More specifically, in the present embodiment, the communication controller 69 acquires the delivery destination location information and various kinds of information from the terminal apparatus 70 or an external apparatus when the order receipt processing unit 61 receives the order for package delivery.

A process performed by the communication controller 69 upon receiving the package delivery will be described below. The communication controller 69 transmits the delivery destination location information to the drone 10 that is designated for delivery when or after the order receipt processing unit 61 receives the order for package delivery.

A process performed by the communication controller 69 for package delivery will be described below. The communication controller 69 receives the delivery preparation completion information from the drone 10 that is designated for delivery. The communication controller 69 transmits information indicating a delivery instruction to the drone 10 that is designated for delivery. The communication controller 69 receives arrival notice information from the drone 10. The communication controller 69, when receiving the arrival notice information from the drone 10, transmits the arrival notice information to the terminal apparatus 70. The communication controller 69 receives the receiving location identification video and the current location information from the terminal apparatus 70. The communication controller 69 transmits the receiving location identification video and the current location information on the terminal apparatus 70, which are received from the terminal apparatus 70, to the drone 10.

The communication controller 69 transmits, to the terminal apparatus 70, the re-transmission request for the receiving location identification video that is received from the drone 10. The communication controller 69 transmits, to the drone 10, the receiving location identification video that is re-transmitted from the terminal apparatus 70.

Terminal Apparatus

Figure 5:
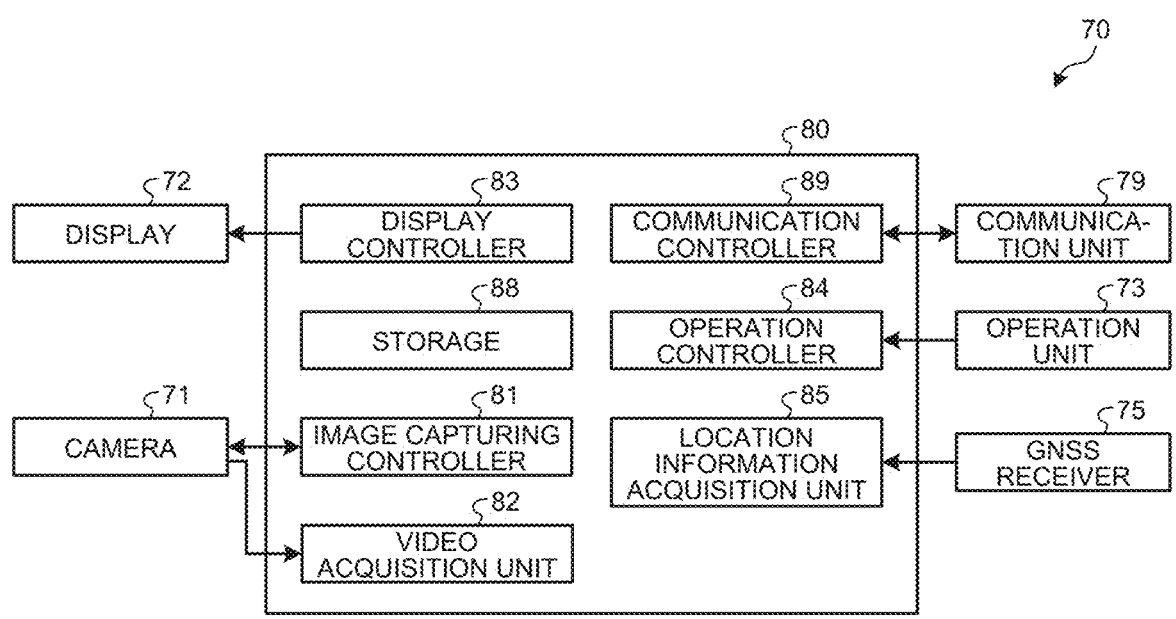
FIG. 5 is a block diagram illustrating a configuration example of a terminal apparatus.

FIG. 5 is a block diagram illustrating a configuration example of the terminal apparatus 70. More specifically, the terminal apparatus 70 is a terminal apparatus that is operated by the orderer who receives the package at the destination. The terminal apparatus 70 is, for example, a mobile electronic device, such as a smartphone. The terminal apparatus 70 is able to communicate information with the package delivery control apparatus 50 via a network. The terminal apparatus 70 includes a camera 71, a display 72, an operation unit 73, a GNSS receiver 75, a communication unit 79, and a controller 80.

The camera 71 is a camera that captures a video around the terminal apparatus 70. The camera 71 captures the receiving location identification video by which the receiving location is identifiable. Imaging by the camera 71 is controlled via, for example, an operation controller 84. The camera 71 captures the receiving location identification video by which the receiving location is identifiable, when a user who is the orderer operates the operation unit 73, for example. The camera 71 outputs the captured video to a video acquisition unit 82 of the controller 80. The camera 71 captures the receiving location identification video. The receiving location identification video that is captured by the camera 71 and transmitted to the package delivery control apparatus 50 may be a still image or a moving image.

The display 72 is, for example, a display including a liquid crystal display, an Electro-Luminescence (EL) display, or the like. The display 72 displays a video based on a video signal that is output from a display controller 83 of the controller 80. The display 72 displays, for example, an order placement screen for placing order of a package, a video upon capturing the receiving location identification video by which the receiving location is identifiable, or the like.

The operation unit 73 is a touch panel that is included in the display 72. The operation unit 73 is able to receive order placement operation. Further, the operation unit 73 is able to receive operation for instructing the camera 71 to capture an image. The operation unit 73 outputs the operation information to the operation controller 84 of the controller 80.

The GNSS receiver 75 receives a GNSS signal from GNSS satellites. The GNSS receiver 75 outputs the received GNSS signal to a location information acquisition unit 85 of the controller 80. The GNSS receiver 75 is configured with, for example, a GNSS receiver, an antenna, and the like that are able to receive the GNSS signal.

The communication unit 79 is a communication unit that performs wide area radio communication. The communication unit 79 communicates information with the package delivery control apparatus 50 via a network, for example. The network is, for example, the Internet network, but not limited thereto. The communication unit 79 is configured with, for example, a wide area radio communication module for a mobile phone network. The communication unit 79 may be configured with a communication module for Wi-Fi (registered trademark) or the like, and may realize wide area radio communication by connecting to an arbitrary access point, a different smartphone, or the like.

Controller

The controller 80 is, for example, an arithmetic processing device (control device) that includes a CPU or the like. The controller 80 loads a stored program onto a memory and executes a command that is included in the program. The controller 80 includes an internal memory (not illustrated), and the internal memory is used to temporarily store therein data for the controller 80. The controller 80 controls the terminal apparatus 70. The controller 80 includes an image capturing controller 81, the video acquisition unit 82, the display controller 83, the operation controller 84, the location information acquisition unit 85, a storage 88, and a communication controller 89.

The image capturing controller 81 controls image capturing performed by the camera 71. More specifically, the image capturing controller 81 causes the camera 71 to perform image capturing based on an image capturing instruction that is issued by the operation controller 84.

The video acquisition unit 82 acquires a video that is captured by the camera 71. The video acquisition unit 82 outputs the acquired video to the communication controller 89.

The display controller 83 controls display of a video on the display 72. The display controller 83 outputs a video signal for causing the display 72 to output a video. More specifically, the display controller 83, when the order for package delivery is placed, outputs a video signal for displaying an image of a screen for performing the order placement process. Furthermore, the display controller 83 outputs, when the image capturing controller 81 causes the camera 71 to capture an image, a video signal for displaying the video that is acquired by the video acquisition unit 82.

The operation controller 84 receives operation of performing the order placement process upon placing the order for package delivery. In the present embodiment, the operation controller 84 receives, for example, operation of inputting the delivery destination location information and various kinds of information. The operation controller 84 outputs the acquired operation information as a control signal. The operation information that is acquired by the operation controller 84 is output from the terminal apparatus 70 to the package delivery control apparatus 50.

The location information acquisition unit 85 calculates current location information on the terminal apparatus 70 based on a radio wave that is received by the GNSS receiver 75, by a well-known method.

The storage 88 is a storage device that stores therein a program, data, and the like that are used by the controller 80. As the storage unit 88, for example, at least one of a non-volatile semiconductor memory and a volatile semiconductor memory, such as a RAM, a ROM, a flash memory, an EPROM, and an EEPROM, is used.

The communication controller 89 controls the communication unit 79 and controls communication with the package delivery control apparatus 50. In the present embodiment, the communication controller 89, upon placing the order for package delivery, transmits various kinds of information, such as the destination location information and the package information, to the package delivery control apparatus 50. The communication controller 89 transmits the receiving location identification video and the current location information to the package delivery control apparatus 50.

The communication controller 89 receives, from the package delivery control apparatus 50, a re-transmission request for the receiving location identification video that is received from the drone 10. The communication controller 89 re-transmits the receiving location identification video to the package delivery control apparatus 50.

Information Processing Performed by Package Delivery System

A flow of processes performed by the package delivery system 1 will be described below. First, the package delivery control apparatus 50 receives an order for a package from an orderer. At this time, the package delivery control apparatus 50 acquires, for example, information for communicably identifying the terminal apparatus 70 of the orderer, the delivery destination location information, and the receiving location identification video.

Further, the package delivery control apparatus 50 transmits the delivery destination location information and the receiving location identification video to the drone 10 on which the package that is ordered by the orderer is mounted.

Furthermore, the drone 10 on which the package that is ordered by the orderer is mounted starts to fly while adopting the delivery destination location information as a destination.

Figure 6:
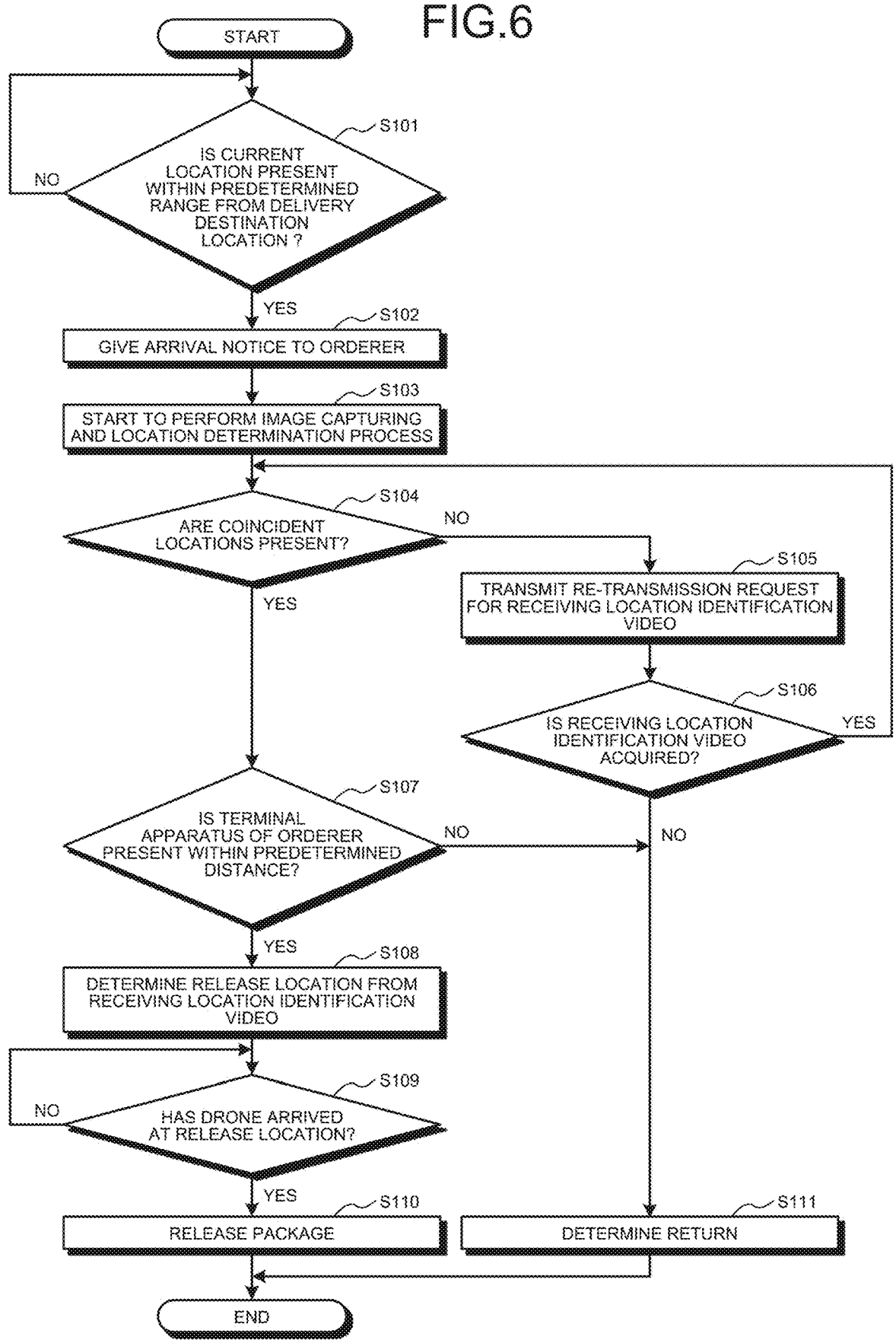
FIG. 6 is a diagram illustrating an example of a flow of processes performed by the drone of the package delivery system according to the first embodiment.

An example of a flow of processes performed by the drone 10 will be described below with reference to FIG. 6. FIG. 6 is a diagram illustrating an example of a flow of processes performed by the drone 10 of the package delivery system 1 according to the first embodiment. The process illustrated in FIG. 6 is performed after the drone 10 has started to fly.

The controller 20 determines whether or not the current location on the drone 10 is present within a predetermined range from the delivery destination location (Step S101). More specifically, the controller 20 causes the arrival determination unit 31 to determine whether or not the current location on the drone 10 is within the predetermined range of the delivery destination location that represents a longitude and a latitude of the destination based on the location information that is acquired by the location information acquisition unit 21 and the delivery destination location information that is acquired from the package delivery control apparatus 50 via the communication unit 19. Within the predetermined range may be read as within a predetermined distance and indicates, for example within 10 m or a case in which an expected arrival time to a delivery destination location is less than 1 minute based on a flight speed of the drone. When the arrival determination unit 31 determines that the current location on the drone 10 is within the predetermined range from the delivery destination location (Yes at Step S101), the controller 20 goes to Step S102. When the arrival determination unit 31 does not determine that the current location on the drone 10 is within the predetermined range from the delivery destination location (No at Step S101), the controller 20 performs the process at Step S101 again.

When it is determined that the current location on the drone 10 is within the predetermined range from the delivery destination location (Yes at Step S101), the controller 20 gives an arrival notice to the orderer (Step S102). More specifically, the controller 20 causes the communication controller 29 to transmit the arrival notice information to the package delivery control apparatus 50. The package delivery control apparatus 50, upon receiving the arrival notice information from the drone 10, transmits the arrival notice information to the terminal apparatus 70. The controller 20 goes to Step S103.

The controller 20 starts to perform image capturing and a location determination process (Step S103). More specifically, the controller 20 causes the video acquisition unit 23 to acquire the video that is captured by the camera 13. The controller 20 causes the location determination unit 32 to perform the location determination process of comparing the video that is captured by the camera 13 and the receiving location identification video of the package that is acquired via the communication unit 19 and determining whether or not the coincident locations are present. The controller 20 goes to Step S104.

The controller 20 determines whether or not coincident locations are present (Step S104). More specifically, the controller 20 causes the location determination unit 32 to compare the video that is captured by the camera 13 and the receiving location identification video of the package that is acquired via the communication unit 19 and determine whether or not the coincident locations are present. When the location determination unit 32 determines that the coincident locations are present (Yes at Step S104), the controller 20 goes to Step S107. When the location determination unit 32 does not determine that the coincident locations are present (No at Step S104), the controller 20 goes to Step S105.

When the location determination unit 32 does not determine that the coincident locations are present (No at Step S104), the controller 20 transmits a re-transmission request for the receiving location identification video (Step S105). The controller 20 causes the communication controller 29 to transmit, to the package delivery control apparatus 50 via the communication unit 19, the re-transmission request for the receiving location identification video with respect to the terminal apparatus 70. The package delivery control apparatus 50, upon receiving the re-transmission request for the receiving location identification video from the drone 10, transmits the re-transmission request for the receiving location identification video to the terminal apparatus 70. The controller 20 goes to Step S106.

After execution of the process at Step S105, the terminal apparatus 70 receives the re-transmission request for the receiving location identification video via the package delivery control apparatus 50. The terminal apparatus 70 re-transmits the receiving location identification video via the package delivery control apparatus 50. It is effective to limit the number of times, such as once or twice as an upper limit, as for the re-transmission request for the receiving location identification video. Further, the re-transmission request for the receiving location identification video may be a request for a different receiving location identification video from the receiving location identification video that is acquired upon placing the order for the package. The receiving location identification video that is acquired upon placing the order for the package is a receiving location identification video that is captured upon placing the order for the package or a receiving location identification video that is captured in advance. In contrast, by requesting image capturing of the receiving location identification video at the re-transmission request, it is possible to compare a video that is temporally close to the video that is captured by the camera 13 of the drone 10. Therefore, it is possible to reduce an influence of a difference of weather and sunshine upon comparing the video captured by the camera with the receiving location identification video.

The controller 20 determines whether or not the receiving location identification video is acquired (Step S106). The controller 20 causes the communication controller 29 to determine whether or not the receiving location identification video that is re-transmitted by the terminal apparatus 70 is acquired from the package delivery control apparatus 50 via the communication unit 19. When the communication controller 29 determines that the re-transmitted receiving location identification video is acquired (Yes at Step S106), the controller 20 performs the process at Step S104 again. When the communication controller 29 does not determine that the re-transmitted receiving location identification video is acquired (No at Step S106), the controller 20 goes to Step S111. As for the case in which it is not determine that the receiving location identification video is acquired, it is determined as No at Step S106 when the receiving location identification video is not acquired within, for example, three minutes since the re-transmission request for the receiving location identification video is issued at Step S105.

When it is determined that the coincident locations are present (Yes at Step S104), the controller 20 determines whether or not the terminal apparatus 70 of the orderer is present within a predetermined distance (Step S107). More specifically, the controller 20 causes the orderer determination unit 33 to determine whether or not the terminal apparatus 70 is present within the predetermined distance from the current location of the drone 10 based on the current location information on the drone 10 and the current location information on the terminal apparatus 70 that is acquired from the terminal apparatus 70 that is owned by the orderer of the package via the communication unit 19. When the orderer determination unit 33 determines that the terminal apparatus 70 of the orderer is present within the predetermined distance (Yes at Step S107), the controller 20 goes to Step S108. When the orderer determination unit 33 does not determine that the terminal apparatus 70 of the orderer is present within the predetermined distance (No at Step S107), the controller 20 goes to Step S111. When it is not determined that the terminal apparatus 70 of the orderer is present within the predetermined distance (No at Step S107), it may be possible to notify the terminal apparatus 70 of a message, such as "are you present in the receiving location?"

When it is determined that the terminal apparatus 70 of the orderer is present within the predetermined distance (Yes at Step S107), the controller 20 determines the release location from the receiving location identification video (Step S108). More specifically, the controller 20 causes the release location determination unit 34 to perform an image recognition process on the receiving location identification video and identifies a release location. Further, the controller 20 causes the flight controller 36 to continue flight to the identified release location. The controller 20 goes to Step S109.

The controller 20 determines whether or not the drone 10 has arrived at the release location (Step S109). More specifically, when the release location determination unit 34 performs the image recognition process on the video that is captured by the camera 13 and when the determined release location is recognized, the controller 20 determines that the drone 10 has arrived at the release location of the package. When the release location determination unit 34 determines that the drone 10 has arrived at the release location (Yes at Step S109), the controller 20 goes to Step S110. When the release location determination unit 34 does not determine that the drone 10 has arrived at the release location (No at Step S109), the controller 20 performs the process at Step S109 again.

When it is determined that the drone 10 has arrived at the release location (Yes at Step S109), the controller 20 releases the package (Step S110). More specifically, the controller 20 causes the release controller 38 to perform package release operation at the release location.

The controller 20 determines return (Step S111). More specifically, the controller 20 causes the flight controller 36 to fly to the location at which the flight has been started.

As described above, in the present embodiment, at the delivery of the package, the orderer of the package transmits the receiving location identification video. The drone 10 detects a location that coincides with the receiving location identification video from the video that is captured by the camera 13. Further, when the terminal apparatus 70 of the orderer is present within the predetermined distance, the package is released at the release location. In this manner, according to the present embodiment, it is possible to prevent erroneous release at a location that is similar to the release location. According to the present embodiment, it is possible to appropriately deliver a package by the drone.

Second Embodiment

Figure 7:
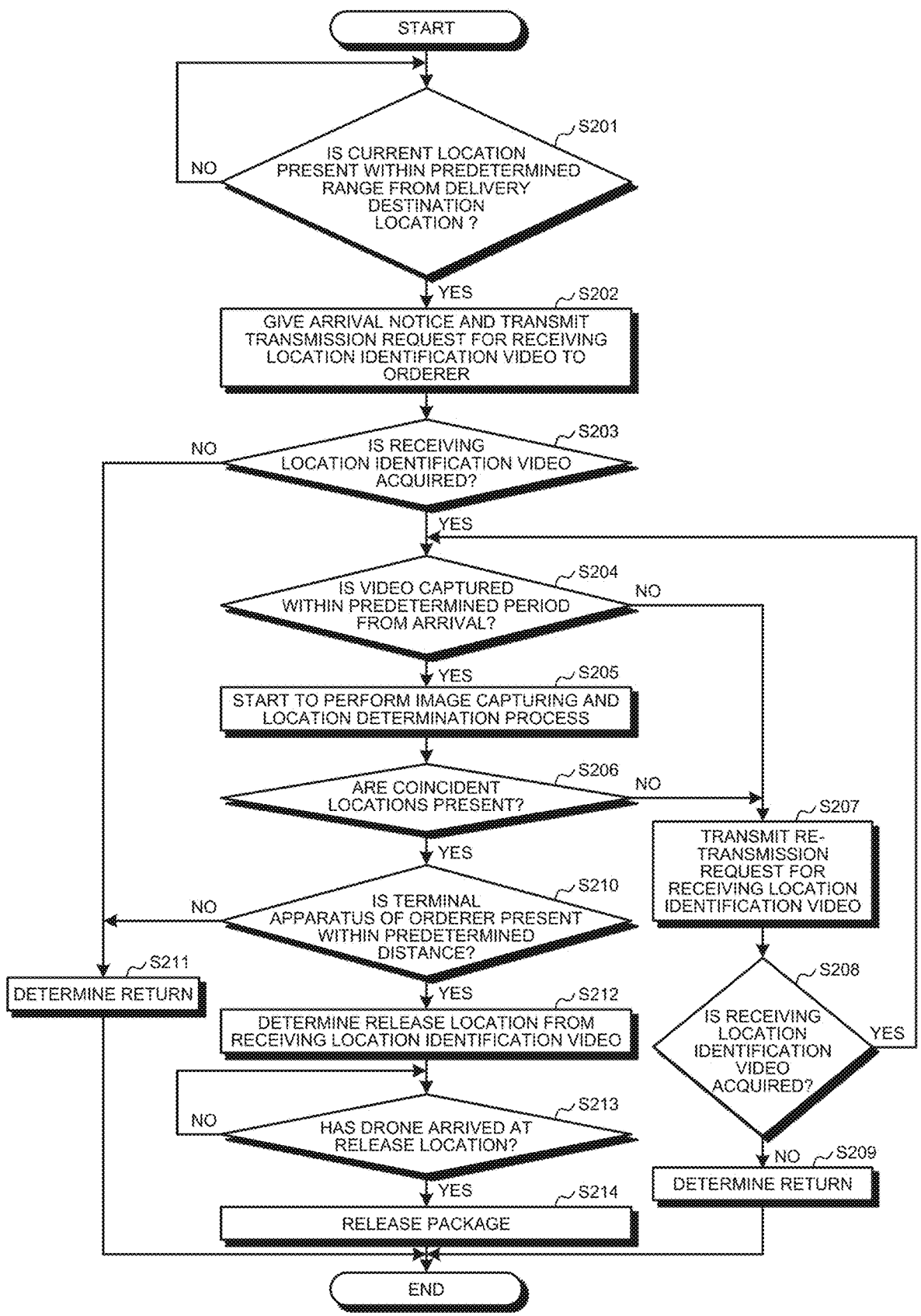
FIG. 7 is a diagram illustrating an example of a flow of processes performed by the drone of the package delivery system according to a second embodiment.

A package delivery system 1 according to a second embodiment will be described below with reference to FIG. 7. FIG. 7 is a diagram illustrating an example of a flow of processes performed by a drone 10 of the package delivery system according to the second embodiment. A basic configuration of the drone 10 of the second embodiment is the same as that of the drone 10 of the first embodiment. In the description below, the same components as those of the drone 10 of the first embodiment will be denoted by the same reference symbols or corresponding reference symbols, and detailed explanation thereof will be omitted. The drone 10 is different from the first embodiment in that the location determination unit 32 performs a different process.

In the present embodiment, when the drone 10 arrives at a location of a delivery destination, the drone 10 transmits a transmission request for the receiving location identification video to the terminal apparatus 70.

When an image capturing time of the receiving location identification video is within a predetermined period, such as about 60 seconds, since a time at which the arrival determination unit 31 determines that the current location of the drone 10 included in the current location information falls within the predetermined range from the delivery destination location included in the delivery destination location information on the package, the location determination unit 32 compares the video that is captured by the camera 13 and the receiving location identification video, and determines whether or not the coincident locations are present.

The communication controller 29 transmits, to the package delivery control apparatus 50, a transmission request for the receiving location identification video with respect to the terminal apparatus 70.

The communication controller 69 of the package delivery control apparatus 50 transmits, to the terminal apparatus 70, the transmission request for the receiving location identification video that is received from the drone 10. The communication controller 69 transmits, to the drone 10, the receiving location identification video that is transmitted from the terminal apparatus 70.

The communication controller 89 of the terminal apparatus 70 receives, from the package delivery control apparatus 50, the transmission request for the receiving location identification video that is received from the drone 10. The communication controller 89 transmits the receiving location identification video to the package delivery control apparatus 50.

An example of a flow of processes performed by the drone 10 will be described below with reference to FIG. 7. Processes at Step S201, Step S203, Step S205 to Step S208, Step S209, and Step S210 to Step S214 are the same as the processes at Step S101, Step S106, Step S103 to Step S106, Step S111, and Step S107 to Step S110 illustrated in FIG. 5.

The controller 20 gives an arrival notice and transmits a transmission request for the receiving location identification video to the orderer (Step S202). More specifically, the controller 20 causes the communication controller 29 to transmit the arrival notice information to the package delivery control apparatus 50. The controller 20 causes the communication controller 29 to transmit, to the package delivery control apparatus 50 via the communication unit 19, the transmission request for the receiving location identification video with respect to the terminal apparatus 70. The controller 20 goes to Step S203.

The controller 20 determines whether or not the video is a video that is captured within a predetermined period from the arrival (Step S204). More specifically, the controller 20 determines whether or not the receiving location identification video is received via the communication unit 19 within the predetermined period since the determination on arrival by the arrival determination unit 31. When the location determination unit 32 determines that the video is a video within the predetermined period from the arrival (Yes at Step S204), the controller 20 goes to Step S205. When the location determination unit 32 does not determine that the video is a video within the predetermined period from the arrival (No at Step S204), the controller 20 goes to Step S207.

As described above, in the present embodiment, when the drone 10 arrives at the delivery destination, the request for transmission of the receiving location identification video is issued to the orderer of the package. When acquiring the receiving location identification video that is captured within the predetermined period since from the transmission request for the receiving location identification video, the drone 10 detects, from the video that is captured by the camera 13, a location that coincides with the receiving location identification video. According to the present embodiment, it is possible to determine whether or not the coincident locations are present by using the receiving location identification video upon delivering the package.

Third Embodiment

Figure 8:
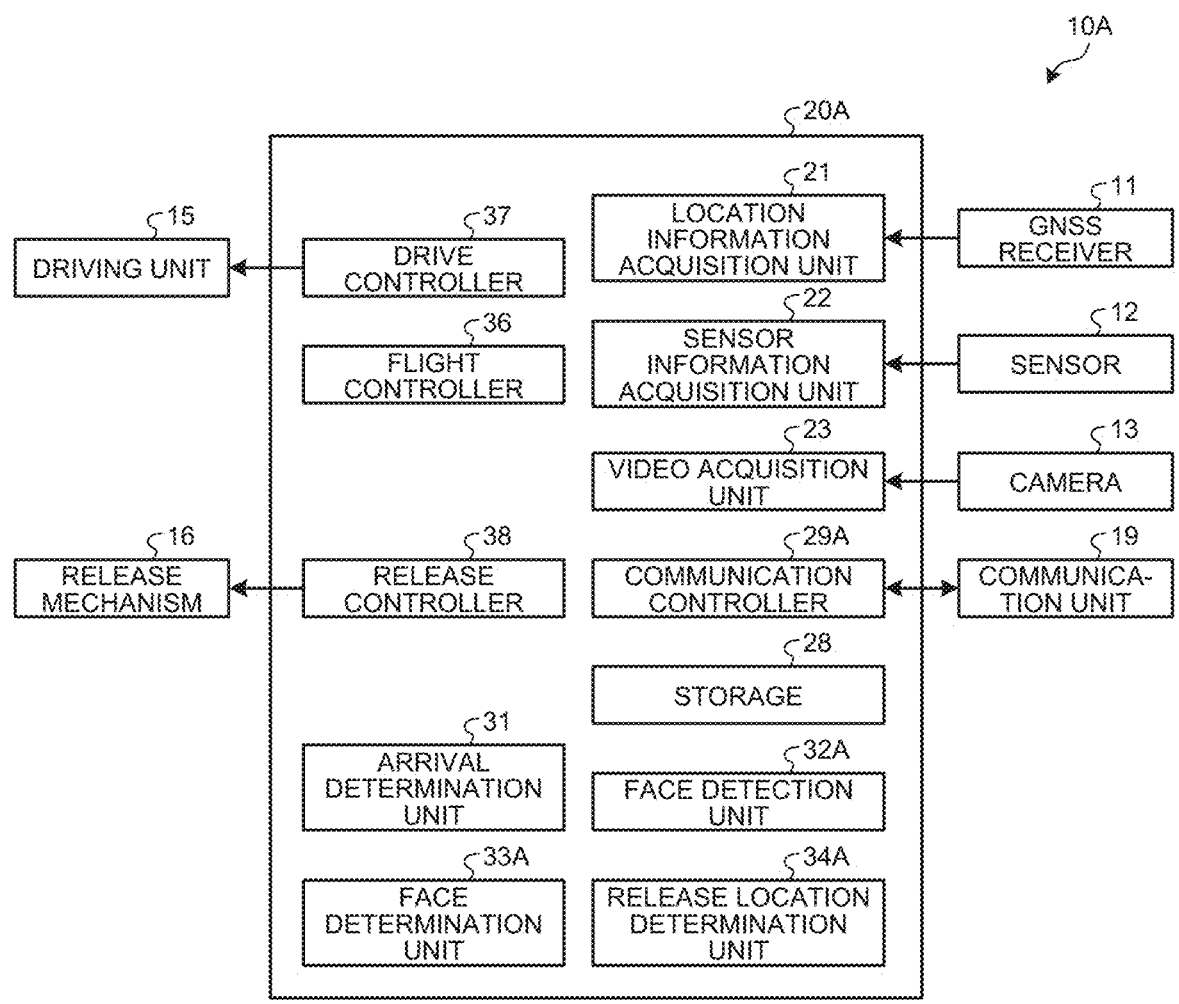
FIG. 8 is a block diagram illustrating a configuration example of the drone according to the second embodiment.
Figure 9:
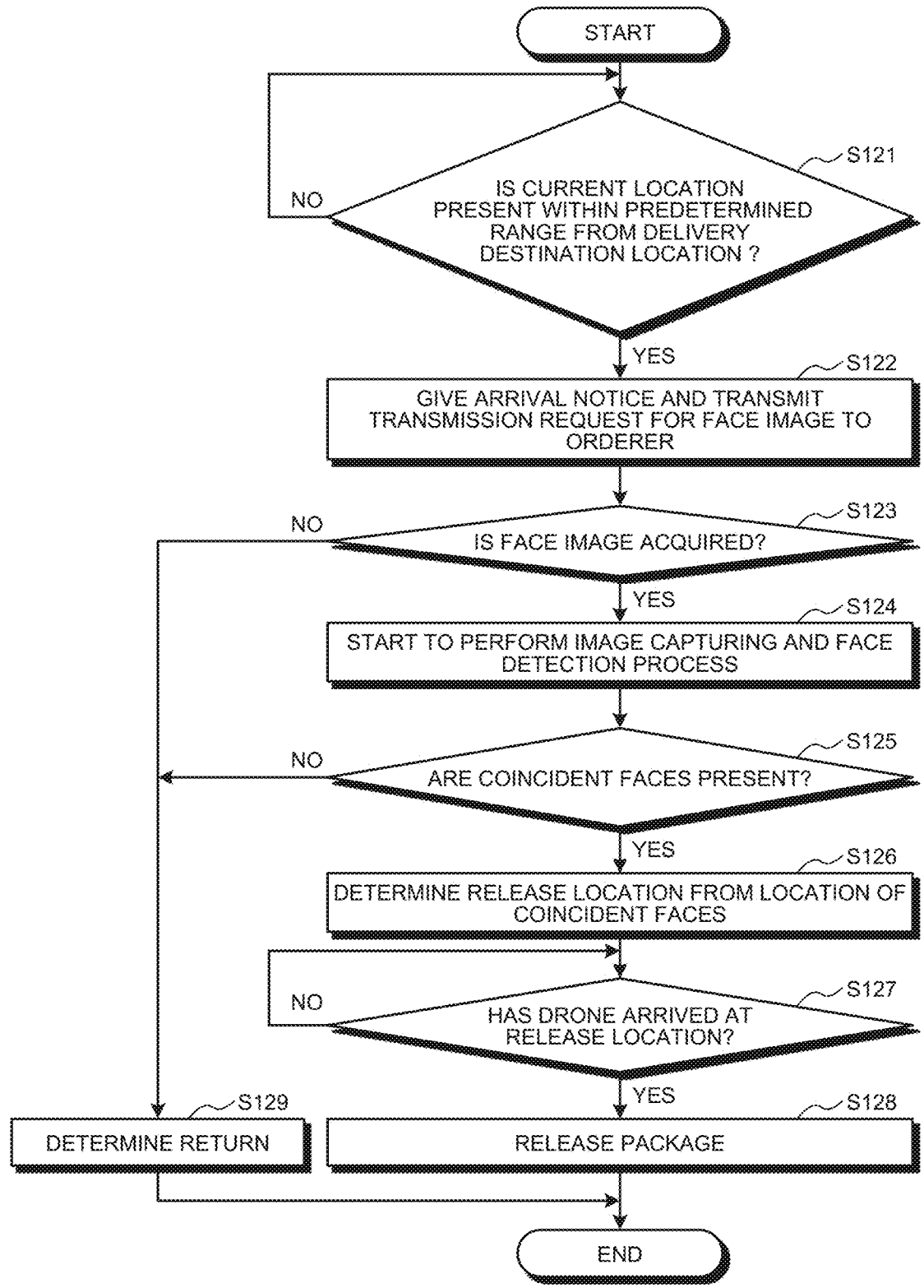
FIG. 9 is a diagram illustrating an example of a flow of processes performed by the drone of the package delivery system according to a third embodiment.

A package delivery system 1 according to a third embodiment will be described below with reference to FIG. 8 and FIG. 9. FIG. 8 is a block diagram illustrating a drone 10A according to the third embodiment. FIG. 9 is a diagram illustrating an example of a flow of processes performed by the drone 10A of the package delivery system according to the third embodiment. A basic configuration of the drone 10A of the third embodiment is the same as that of the drone 10 of the first embodiment. The drone 10A is different from the first embodiment in terms of a controller 20A.

In the present embodiment, when the drone 10A arrives at a location of a delivery destination, the drone 10A transmits a transmission request for a face image to the terminal apparatus 70.

The controller 20A includes the location information acquisition unit 21, the sensor information acquisition unit 22, the video acquisition unit 23, the storage 28, a communication controller 29A, the arrival determination unit 31, a face detection unit 32A, a face determination unit 33A, a release location determination unit 34A, the flight controller 36, the drive controller 37, and the release controller 38.

The face detection unit 32A, when the arrival determination unit 31 determines that the current location of the drone 10 included in the current location information falls within a predetermined range from the delivery destination location included in the delivery destination location information on the package, detects a human face from a video that is captured by the camera 13 and a video that is acquired via the communication unit 19. As for a method of detecting a human face from the video, a well-known method is applicable, and the method is not specifically limited.

The face determination unit 33A compares the human face that is detected from the video that is captured by the camera 13 and the human face that is acquired via the communication unit 19, and determines whether or not the human faces coincide with each other.

In the present embodiment, when a time at which the human face is detected from the video that is captured by the camera 13 and an image capturing time of the video that is captured by the camera 13 are the same or fall within a predetermined period, the face determination unit 33A compares the human face that is detected from the video that is captured by the camera 13 and the human face that is acquired via the communication unit 19, and determines whether or not the human faces coincide with each other.

When the face determination unit 33A determines that the human face that is detected from the video that is captured by the camera 13 and the human face that is acquired via the communication unit 19 coincide with each other, the release location determination unit 34A determines a location of the human face that is detected from the video that is captured by the camera 13 as a release location of the package.

The communication controller 29A transmits, to the package delivery control apparatus 50, a transmission request for the face image with respect to the terminal apparatus 70.

The communication controller 69 of the package delivery control apparatus 50 transmits, to the terminal apparatus 70, the transmission request for the face image that is received from the drone 10A. The communication controller 69 transmits, to the drone 10A, the face image that is transmitted from the terminal apparatus 70.

The communication controller 89 of the terminal apparatus 70 receives, from the package delivery control apparatus 50, the transmission request for the face image that is received from the drone 10A. The communication controller 89 transmits the face image to the package delivery control apparatus 50. The face image that is captured by the camera 71 of the terminal apparatus 70 and that is transmitted to the package delivery control apparatus 50 may be a still image or a moving image.

An example of a flow of processes performed by the drone 10A will be described below with reference to FIG. 9. Processes at Step S121, Step S128, and Step S129 are the same as the processes at Step S101, Step S110, and Step S111 illustrated in FIG. 6.

The controller 20A gives an arrival notice and transmits a transmission request for a face image to the orderer (Step S122). More specifically, the controller 20A causes the communication controller 29A to transmit the arrival notice information to the package delivery control apparatus 50. The controller 20A causes the communication controller 29A to transmit a transmission request for a face image to the package delivery control apparatus 50. The controller 20A goes to Step S123.

The controller 20A determines whether or not the face image is acquired (Step S123). The controller 20A causes the communication controller 29A to determine whether or not the face image is acquired from the package delivery control apparatus 50 via the communication unit 19. When the communication controller 29A determines that the face image is acquired (Yes at Step S123), the controller 20A goes to Step S124. When the communication controller 29A does not determine that the face image is acquired (No at Step S123), the controller 20A goes to Step S129. When it is not determined that the face image is acquired (No at Step S123), it may be possible to request re-transmission of the face image by the limited number of times, such as once.

The controller 20A starts image capturing and starts a face detection process (Step S124). More specifically, the controller 20A causes the face detection unit 32A to detect a human face from the video that is captured by the camera 13 and the video that is acquired via the communication unit 19. The controller 20A goes to Step S125.

The controller 20A determines whether or not coincident faces are present (Step S125). More specifically, the controller 20A causes the face determination unit 33A to compare the human face that is detected from the video that is captured by the camera 13 and the human face that is detected from the video that is acquired via the communication unit 19. When the face determination unit 33A determines that coincident faces are present (Yes at Step S125), the controller 20A goes to Step S126. When the face determination unit 33A does not determine that coincident faces are present (No at Step S125), the controller 20A goes to Step S129. When it is not determined that coincident faces are present (No at Step S125), it may be possible to give a notice, such as "please come to receiving location where drone is viewable", to the terminal apparatus 70 via the package delivery control apparatus 50.

When it is determined that coincident faces are present (Yes at Step S125), the controller 20A determines the release location based on a location of the coincident faces (Step S126). More specifically, the controller 20A causes the release location determination unit 34A to determine, for example, a location in front of the human face detected from the video that is captured by the camera 13 as the release location of the package. Further, the controller 20A causes the flight controller 36 to continue flight to the determined release location. The controller 20A goes to Step S127.

The controller 20A determines whether or not the drone 10A has arrived at the release location (Step S127). More specifically, the controller 20A causes the release location determination unit 34A to perform an image recognition process on the video that is captured by the camera 13, and when the determined release location is recognized, determines that the drone 10A has arrived at the release location of the package. When the release location determination unit 34A determines that the drone 10A has arrived at the release location (Yes at Step S127), the controller 20A goes to Step S128. When the release location determination unit 34A does not determine that the drone 10A has arrived at the release location (No at Step S127), the controller 20A performs the process at Step S127 again.

As described above, in the present embodiment, at the package delivery, the orderer of the package transmits a face image of the orderer. The drone 10A detects a person whose face image coincides with the face image from the video that is captured by the camera 13. Further, when the person whose face image coincides with the face image from the video is detected, the package is released near the person. According to the present embodiment, it is possible to prevent the package from being erroneously released to a third person different from the orderer.

Fourth Embodiment

Figure 10:
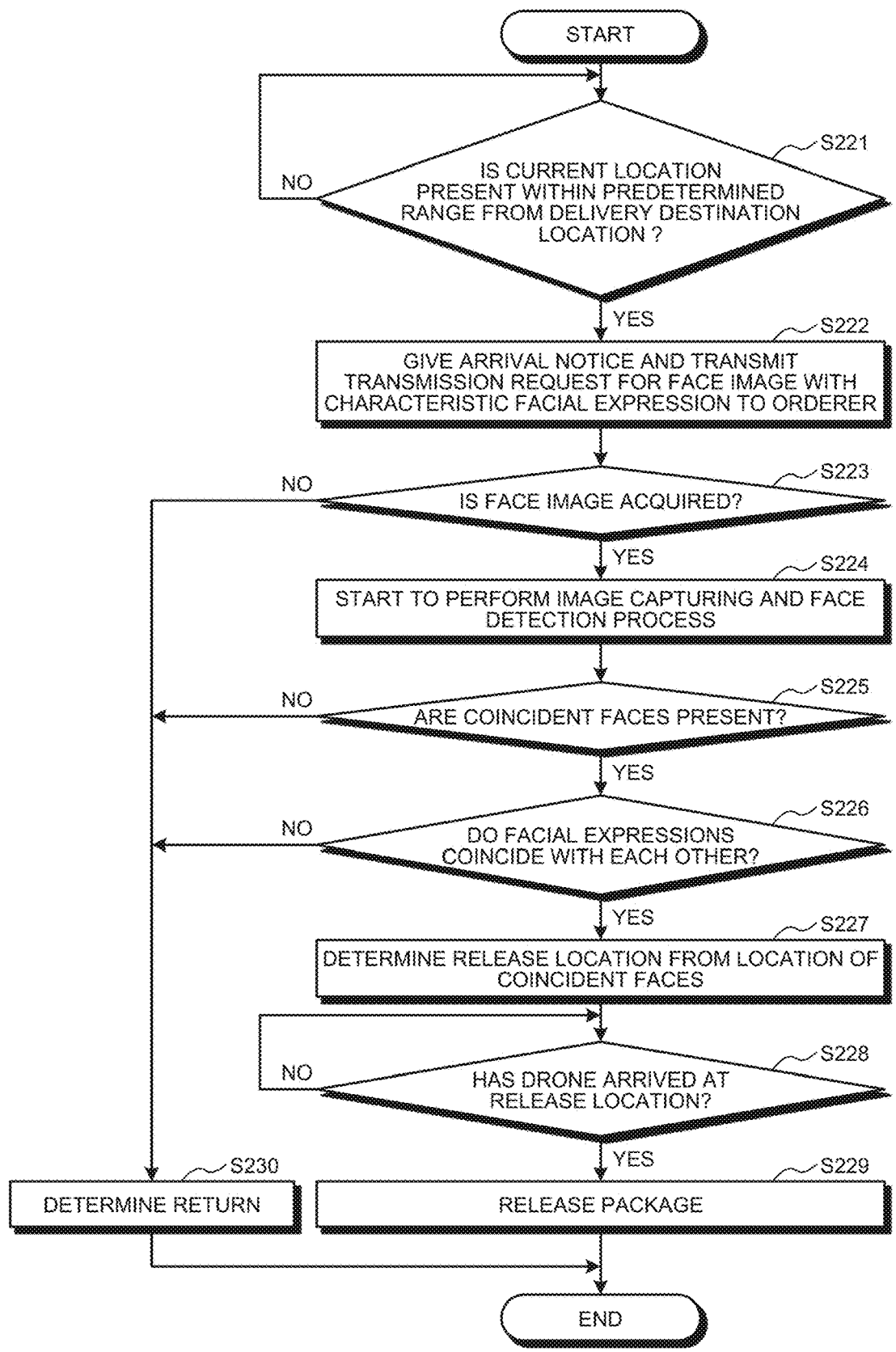
FIG. 10 is a diagram illustrating an example of a flow of processes performed by the drone of the package delivery system according to a fourth embodiment.

A package delivery system 1 according to a fourth embodiment will be described below with reference to FIG. 10. FIG. 10 is a diagram illustrating an example of a flow of processes performed by a drone of the package delivery system according to the fourth embodiment. A basic configuration of a drone 10A of the fourth embodiment is the same as that of the drone 10A of the third embodiment. The drone 10A is different from the third embodiment in terms of processes performed by the face detection unit 32A and the face determination unit 33A.

The face detection unit 32A detects a human face from the video that is captured by the camera 13 and the video that is acquired via the communication unit 19 and a facial expression on the detected human face.

The face determination unit 33A compares the human face that is detected from the video that is captured by the camera 13 and the human face that is detected from the video that is acquired via the communication unit 19, and determines whether or not the faces coincide with each other and facial expressions coincide with each other.

When the face determination unit 33A determines that the human face and the facial expression that are detected from the video that is captured by the camera 13 and the human face and the facial expression that are detected from the video that is acquired via the communication unit 19 coincide with each other, the release location determination unit 34A determines a location of the human face that is detected from the video that is captured by the camera 13 as the release location of the package.

When transmitting, to the package delivery control apparatus 50, the transmission request for the face image with respect to the terminal apparatus 70, the communication controller 29A may request transmission of a face image of a face with a characteristic facial expression.

The face with the characteristic facial expression is, for example, a facial expression, such as a simile, that is different from that at a regular time, or a facial expression that is easily distinguished from a normal facial expression.

An example of a flow of processes performed by the drone 10A will be described below with reference to FIG. 10. Processes at Step S221, Step S223 to Step S225, and Step S227 to Step S230 are the same as the processes at Step S121, Step S123 to Step S125, and Step S126 to Step S129 illustrated in FIG. 9.

The controller 20A gives an arrival notice and transmits a transmission request for a face image with a characteristic facial expression to the orderer (Step S222). More specifically, the controller 20A causes the communication controller 29A to transmit the arrival notice information to the package delivery control apparatus 50. The controller 20A causes the communication controller 29A to transmit the transmission request for the face image with the characteristic facial expression to the package delivery control apparatus 50. The controller 20A goes to Step S223.

The controller 20A determines whether or not the facial expressions coincide with each other (Step S226). More specifically, the controller 20A compares the human face that is detected from the video that is captured by the camera 13 and the human face that is detected from the video that is acquired via the communication unit 19, and determines whether or not the faces and the facial expressions coincide with each other. When the face determination unit 33A determines that the facial expressions coincide with each other (Yes at Step S226), the controller 20A goes to Step S227. When the face determination unit 33A does not determine that the facial expressions coincide with each other (No at Step S226), the controller 20A goes to Step S230.

As described above, in the present embodiment, when a person whose face image and the facial expression in the video captured by the camera 13 coincide with those in the video acquired via the communication unit 19 is detected, the package is released near the person. According to the present embodiment, it is possible to more appropriately determine the orderer.

Fifth Embodiment

A package delivery system 1 according to a fifth embodiment will be described below with reference to FIG. 11. FIG. 11 is a diagram illustrating an example of a flow of processes performed by a drone of the package delivery system according to the fifth embodiment. A basic configuration of a drone 10A of the fifth embodiment is the same as that of the drone 10A of the fourth embodiment. The drone 10A is different from the fourth embodiment in terms of a process performed by the face determination unit 33A. In the present embodiment, it is preferable that a face image that is captured by the camera 71 of the terminal apparatus 70 and transmitted to the package delivery control apparatus 50 is a moving image.

The face determination unit 33A compares the human face that is detected from the video that is captured by the camera 13 and the human face that is detected from the video that is acquired via the communication unit 19, and determines whether or not the faces coincide with each other and changes in the facial expression coincide with each other.

When the face determination unit 33A determines that the human face and the change in the facial expression detected from the video that is captured by the camera 13 and the human face and the change in the facial expression detected from the video that is acquired via the communication unit 19 coincide with each other, the release location determination unit 34A determines that the location of the human face that is detected from the video that is captured by the camera 13 as a release location of the package.

The communication controller 29A transmits, to the package delivery control apparatus 50, a facial expression change request with respect to the terminal apparatus 70.

The communication controller 69 of the package delivery control apparatus 50 transmits, to the terminal apparatus 70, the facial expression change request that is received from the drone 10A. The communication controller 69 transmits, to the drone 10A, the face image that is transmitted from the terminal apparatus 70.

The communication controller 89 of the terminal apparatus 70 receives, from the package delivery control apparatus 50, the facial expression change request that is received from the drone 10A. The communication controller 89 transmits, to the package delivery control apparatus 50, a moving image in which the face is captured as the face image. The user of the terminal apparatus 70 changes a facial expression while capturing an image of the face thereof.

An example of a flow of processes performed by the drone 10A will be described below with reference to FIG. 11. Processes at Step S321, Step S323 to Step S325, and Step S328 to Step S331 are the same as the processes at Step S121, Step S123 to Step S125, and Step S126 to Step S129 illustrated in FIG. 9.

The controller 20A gives an arrival notice and transmits a transmission request for a face image to the orderer (Step S322). The face image for which the transmission request is issued is a moving image, and image capturing and transmission of the moving image are continued until determination at Step S327.

The controller 20A transmits the facial expression change request (Step S326). More specifically, the controller 20A causes the communication controller 29A to transmit the facial expression change request to the package delivery control apparatus 50. The controller 20A goes to Step S327.

The controller 20A determines whether or not the changes in the facial expressions coincide with each other (Step S327). More specifically, the controller 20A causes the face determination unit 33A to compare the human face that is detected from the video that is captured by the camera 13 and the human face that is detected from the video that is acquired via the communication unit 19, and determine whether or not the faces coincide with each other and the changes in the facial expressions coincide with each other. When the face determination unit 33A determines that coincident faces are present (Yes at Step S327), the controller 20A goes to Step S328. When the face determination unit 33A does not determine that coincident faces are present (No at Step S327), the controller 20A goes to Step S331.

As described above, in the present embodiment, when a person whose face image and the change in the facial expression in the video captured by the camera 13 coincide with those in the video acquired via the communication unit 19 is detected, the package is released near the person. According to the present embodiment, it is possible to more appropriately determine the orderer.

The components of the package delivery system illustrated in the drawings are functionally conceptual and do not necessarily have to be physically configured in the manner illustrated in the drawings. In other words, specific forms of each of the apparatuses are not limited to those illustrated in the drawings, and all or part of the apparatuses may be functionally or physically distributed or integrated in arbitrary units depending on various loads or use conditions of each of the apparatuses.

The configuration of the package delivery system may be implemented as, for example, software by a program or the like that is loaded on a memory. In the embodiments as described above, functional blocks that are implemented by cooperation of hardware or software have been described. In other words, the functional blocks may be implemented by various forms by only hardware, by only software, or by a combination of hardware and software.

The components described above include one that can easily be thought of by a person skilled in the art and one that is practically identical. Furthermore, the configurations described above may be combined appropriately. Moreover, within the scope not departing from the gist of the following embodiments, various omission, replacement, and modifications of the components may be made.

For example, the units included in the controller 20 of the drone 10 may be distributed and a part of the units may be implemented in the controller 60 of the package delivery control apparatus 50.

The arrival determination unit 31, the location determination unit 32, the orderer determination unit 33, and the release location determination unit 34 of the controller 20 of the first embodiment and the second embodiment need not always be implemented by execution by the controller 20 of the drone 10, but may be implemented by execution by the package delivery control apparatus 50. In this case, the package delivery control apparatus 50 acquires the video that is captured by the camera 13 of the drone 10 and performs the processes as described above based on information on a package order that is acquired from the terminal apparatus 70 of the orderer. The package delivery control apparatus 50 includes an arrival determination unit, a location determination unit, an orderer determination unit, and a release location determination unit that implements the functions of the arrival determination unit 31, the location determination unit 32, the orderer determination unit 33, and the release location determination unit 34. The package delivery control apparatus 50 performs the same processes as those in the flowchart illustrated in FIG. 6 or FIG. 7. The package delivery control apparatus 50 outputs, when it is determined as Yes at Step S109, a control signal for instructing the drone 10 to release the package. The drone 10 causes the release controller 38 to release the package based on the control signal on the release which is output from the package delivery control apparatus 50.

The arrival determination unit 31, the face detection unit 32A, the face determination unit 33A, and the release location determination unit 34A of the controller 20A of the third embodiment to the fifth embodiment need not always be implemented by execution by the controller 20A of the drone 10A, but may be implemented by execution by the package delivery control apparatus 50. In this case, the package delivery control apparatus 50 acquires the video that is captured by the camera 13 of the drone 10A and performs the processes as described above based on information on a package order that is acquired from the terminal apparatus 70 of the orderer. The package delivery control apparatus 50 includes an arrival determination unit, a location determination unit, an orderer determination unit, and a release location determination unit that implement the functions of the arrival determination unit 31, the face detection unit 32A, the face determination unit 33A, and the release location determination unit 34A. The package delivery control apparatus 50 performs the same processes as those in the flowchart illustrated in FIG. 9, FIG. 10, or FIG. 11.

In the above description, it is explained that the drone 10 autonomously flies. However, when an operator performs operation, the operator may operate a remote controller while viewing a video that is captured by the camera 13 included in the drone 10 and cause the drone 10 to fly to the destination.

The present application includes a matter that contributes to realization of "Build resilient infrastructure, promote inclusive and sustainable industrialization and foster innovation" of Sustainable Development Goals (SDGs) and contributes to value creation by IoT solutions.

The delivery drone and the delivery method according to the present application is applicable to a system that delivers a package by using the drone 10.

According to the present application, it is possible to appropriately deliver a package by a drone.

Although the application has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A delivery drone that delivers a package comprising:
   an imager configured to capture a video around the drone;
   a location determination unit configured to compare, when the drone falls within a predetermined range from a delivery destination location of the package, the video that is captured by the imager and a receiving location identification video of the package that is acquired from an orderer of the package, to determine whether or not coincident locations are present;
   an orderer determination unit configured to determine, when the location determination unit determines that the coincident locations are present in the video that is captured by the imager and the receiving location identification video of the package, whether or not a terminal apparatus that is owned by the orderer of the package is present within a predetermined distance from a current location of the drone; and
   a release location determination unit configured to determine, when the orderer determination unit determines that the terminal apparatus that is owned by the orderer of the package is present within the predetermined distance from the current location of the drone, a location that coincides with the receiving location identification video of the package as a release location of the package.

2. The delivery drone according to claim 1, wherein the location determination unit is further configured to compare the video that is captured by the imager and the receiving location identification video of the package that is acquired from the terminal apparatus that is owned by the orderer of the package, to determine whether or not the coincident locations are present.

3. The delivery drone according to claim 1, wherein the location determination unit is further configured to compare, when an image capturing time of the receiving location identification video is within a predetermined period from a time at which the drone is determined to fall within the predetermined range from the delivery destination location of the package, the video that is captured by the imager and the receiving location identification video of the package, to determine whether or not the coincident locations are present.

4. The delivery drone according to claim 1, wherein the release location determination unit is further configured to detect a characteristic shape or a characteristic object from the receiving location identification video, to determine the release location of the package based on a location of the characteristic shape or the characteristic object.

5. A delivery drone that delivers a package comprising:
   an imager configured to capture a video around the drone;
   a face detection unit configured to detect, when the drone falls within a predetermined range from a delivery destination location of the package, a human face from the video that is captured by the imager and a video that is acquired from an orderer of the package;
   a face determination unit configured to compare the human face that is detected from the video that is captured by the imager and the human face that is detected from the video that is acquired from the orderer of the package, to determine whether or not the human faces coincide with each other; and a release location determination unit configured to determine, when the face determination unit determines that the human face that is detected from the video that is captured by the imager and the human face that is detected from the video that is acquired from the orderer of the package coincide with each other, a location of the human face that is detected from the video that is captured by the imager as a release location of the package.

6. The delivery drone according to claim 5, wherein when a time at the human face is detected from the video that is captured by the imager and an image capturing time of the video that is captured by the imager are same or within a predetermined period, the face determination unit is further configured to compare the human face that is detected from the video that is captured by the imager and the human face that is detected from the video that is acquired from the orderer of the package, to determine whether or not the human faces coincide with each other.

7. The delivery drone according to claim 5, wherein
the face detection unit is further configured to detect the human face from the video that is captured by the imager and the video that is acquired from the orderer of the package, and detect facial expressions of the detected human faces therefrom, the face determination unit is further configured to compare the human face that is detected from the video that is captured by the imager and the human face that is detected from the video that is acquired from the orderer of the package to determine whether or not the human face that is detected from the video that is captured by the imager and the human face that is detected from the video that is acquired from the orderer of the package coincide with each other and the facial expression of the human face detected from the video that is captured by the imager and the facial expression of the human face detected from the video that is acquired from the orderer of the package coincide with each other, and the release location determination unit is further configured to determine, when the face determination unit determines that the human face and the facial expression that are detected from the video that is captured by the imager coincide with the human face and the facial expression that are detected from the video that is acquired from the orderer of the package, a location of the human face that is detected from the video that is captured by the imager as the release location of the package.

8. The delivery drone according to claim 5, wherein
the face determination unit is further configured to compare the human face that is detected from the video that is captured by the imager and the human face that is detected from the video that is acquired from the orderer of the package, to determine whether or not the human face that is detected from the video that is captured by the imager and the human face that is detected from the video that is acquired from the orderer of the package coincide with each other and a change of a facial expression of the human face that is detected from the video that is captured by the imager and a change of a facial expression of the human face that is detected from the video that is acquired from the orderer of the package coincide with each other, and the release location determination unit is further configured to determine, when the face determination unit determines that the human face and the change in the facial expression that are detected from the video that is captured by the imager coincide with the human face and the change in the facial expression that are detected from the video that is acquired from the orderer of the package, a location of the human face that is detected from the video that is captured by the imager as the release location of the package.

9. The delivery drone according to claim 1, further comprising:
a flight controller configured to control flight of the drone; and
a release controller that controls release of the package, wherein
the flight controller is further configured to cause the drone to fly to the release location that is determined by the release location determination unit, and
the release controller is further configured to release the package at the release location.

10. A delivery method implemented by a package delivery system by using a delivery drone comprising:
comparing, when the drone falls within a predetermined range from a delivery destination location of the package, a video that is captured by an imager that captures a video around the drone and a receiving location identification video of the package that is acquired from an orderer of the package to determine whether or not coincident locations are present;
determining, when it is determined that the coincident locations are present in the video that is captured by the imager and the receiving location identification video of the package, whether or not a terminal apparatus that is owned by the orderer of the package is present within a predetermined distance from a current location of the drone; and
determining, when it is determined that the terminal apparatus that is owned by the orderer of the package is present within the predetermined distance from the current location of the drone, a location that coincides with the receiving location identification video of the package as a release location of the package.

* * * * *